United States Patent [19]

Moryl et al.

[11] Patent Number: 4,923,347
[45] Date of Patent: May 8, 1990

[54] ANCHOR NUT-CAGE FIXING SYSTEMS

[75] Inventors: Richard Moryl, Eaubonne; Roger Bouery, Paris, both of France

[73] Assignee: Compagnie De Materiel Et d'Equipements Techniques C.O.M.E.T., France

[21] Appl. No.: 253,511

[22] Filed: Oct. 5, 1988

[30] Foreign Application Priority Data

Oct. 5, 1987 [FR] France .............................. 87 13722

[51] Int. Cl.⁵ .............................................. F16B 37/04
[52] U.S. Cl. .................... 411/182; 411/112; 411/105; 411/432; 411/908
[58] Field of Search .............. 411/103, 105, 108, 111, 411/112, 113, 182, 371–377, 901, 349, 549, 550, 553, 429–431, 908, 533, 546, 547, 44, 45, 55, 432

[56] References Cited

U.S. PATENT DOCUMENTS

| | | | |
|---|---|---|---|
| 3,413,886 | 12/1968 | Proctor | 411/45 |
| 3,421,563 | 1/1969 | Koss | 411/533 X |
| 3,451,455 | 6/1969 | Parkin | 411/108 |
| 3,599,693 | 8/1971 | Bucheli | 411/108 |
| 3,785,421 | 1/1974 | Launay | 411/108 |
| 4,250,732 | 2/1981 | Moryl | 411/108 X |
| 4,303,361 | 12/1981 | Moryl et al. | 411/108 |
| 4,464,091 | 8/1984 | Molina | 411/108 X |

FOREIGN PATENT DOCUMENTS 1501509  2/1978  United Kingdom .................. 411/45

Primary Examiner—Gary L. Smith
Assistant Examiner—F. Saether
Attorney, Agent, or Firm—Larson and Taylor

[57] ABSTRACT

An anchor nut-cage fixing system is provided for positioning on a metal sheet from one of the faces of this metal sheet with a view to receiving bolts presented from this same face and comprising: a nut (1) with wings adapted for cooperating with an elongate hole (3) formed in the metal sheet (4); a plastic material cage (5) split by windows (6) and connected to an external collar (7). This collar is covered by a flat metal cap (9) perforated so as to let the bolts pass therethrough and having axially bent flanges (12) whose axial height is equal to or slightly less than the thickness of the collar, one at least of these flanges being bent to a little more than 90° so as to imprison the collar.

3 Claims, 1 Drawing Sheet

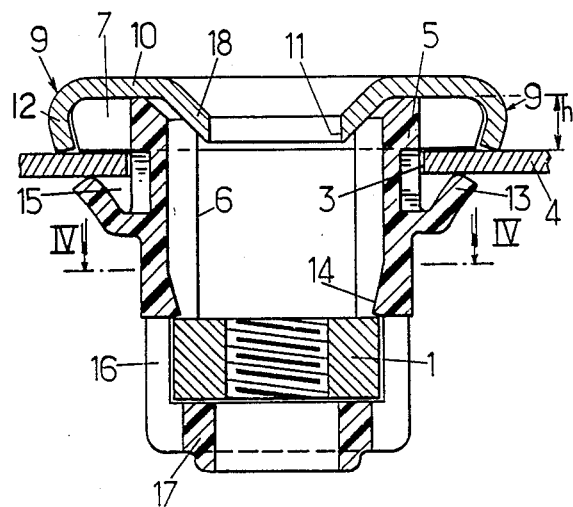
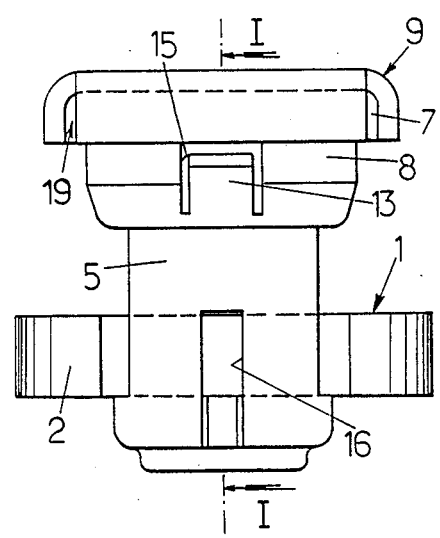
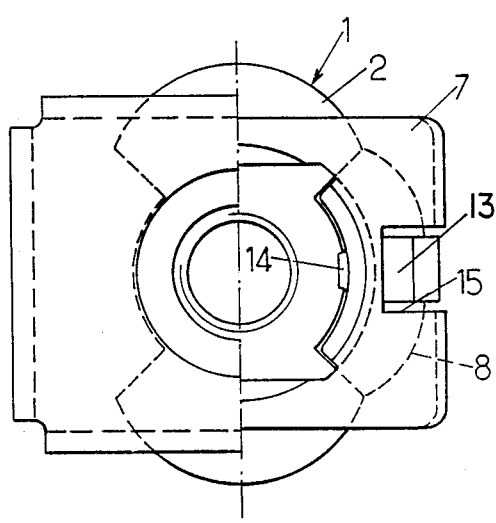
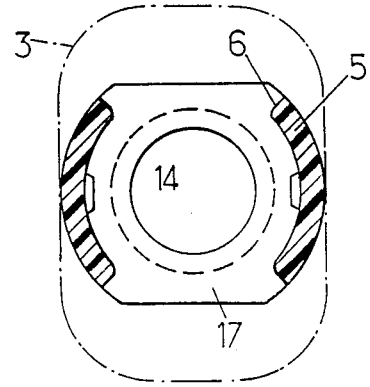

ANCHOR NUT-CAGE FIXING SYSTEMS

BACKGROUND OF THE INVENTION

The present invention relates to anchor nut-cage fixing systems for placing on a metal sheet from one of the faces of the latter with a view to receiving bolts presented from this same face, because of the inaccessibility of the other face due for example to the fact that the metal sheet forms part of a case, closed at least partially, as often happens in the bodywork of vehicles.

It relates more particularly, among said fixing systems, to those comprising:

a wing nut adapted for cooperating with an elongate hole formed in the metal sheet at the desired position, and a holding and guiding cage adapted also to be mounted in this hole, which cage is formed by a moulded plastic material socket split longitudinally by windows through which the wings of the nut pass jointingly, said socket being connected to an external collar at one of its ends, and external bosses integrally moulded with this socket being provided for cooperating with the longitudinal ends of the hole for the purpose of angularly locking the socket after it has been axially introduced with the nut in this hole, and the socket nut assembly thus introduced has been moved through 90°.

Fixing systems of the kind in question, used for fixing on the metal sheet considered at least one piece disposed between the collar of the cage and the head of the bolt, generally give satisfaction.

But, for some uses, they have drawbacks.

One such use is when they are used for mounting an accessory on a vehicle body portion before application of the different paint and protection layers on the body portion.

In fact, the applications in question, which may be carried out when hot and which are generally followed by oven drying, have a number of consequences, in particular the following:

the plastic material collar is crushed, during the screwing providing the desired assembly, between the metal sheet and the piece fixed thereon; these two parts are then only separated from each other, in the vicinity of said collar, by a very small gap in which it is difficult for the often relatively thick paints to penetrate, the end of said screwing, being limited by a reasonable degree of crushing of the collar, is not determined accurately, there is a danger that the heating caused by the painting and/or drying operations damage the crushed collar to the extent that it modifies the clamping torque corresponding to the end of the above screwing and possibly cause slackening of the system.

In addition, the freedom of axial movement of the nut in the cage until it is clamped by screwing up the bolt may form a drawback in some applications, in particular when the screwing up is carried out upwards and/or when the nut is relatively flat and easily introduced into the cage through its windows.

An object of the invention, among others, is to overcome these different drawbacks.

SUMMARY OF THE INVENTION

For this, the fixing system of the invention is essentially characterized in that it comprises a flat metal cap jointedly covering its external collar, which is perforated so as to let the bolts pass and having axially bent flanges whose axial height, from the horizontal interface of collar of and flat bottom 10 to the top of steel plate 4, is equal to or slightly less than the thickness of the collar, one at least of these flanges being bent to a little more than 90° so as to imprison the collar.

In preferred embodiments, recourse is further had to one and/or the other of the following arrangements:

the collar is rectangular, the bent flanges are four in number, each extending along one side of the rectangle and two of these four flanges, opposite in twos, are bent back to more than 90° so as to imprison the collar, the cage comprises external lugs with oblique ramps adapted to bear axially against the perforated metal sheet at the end of positioning the cage on this metal sheet and inner catches with oblique ramps adapted to temporarily maintain the nut in the cage bottom the furthest away from the collar after it has been positioned in this bottom, the resistance opposed by these catches to the axial movements of the nut in the cage being very much less than the resistance opposed by the external lugs to detachment of the cage with respect to the metal sheet.

The invention comprises, apart from these main arrangements, certain other arrangements which are preferably used at the same time and which will be more explicitly discussed hereafter.

BRIEF DESCRIPTION OF THE DRAWINGS

In what follows, a preferred embodiment of the invention will be described with reference to the accompanying drawings in a way which is of course in no way limitative.

FIG. 1 of these drawings shows in axial section through I—I of FIG. 2 a fixing system formed in accordance with the invention mounted on a perforated metal sheet, before application of the piece to be fixed thereon and presentation of the corresponding bolt.

FIGS. 2, 3 and 4 show the same system respectively in a side view, in a top view, the cover cap being removed in the right-hand half of this latter view, and in cross section through IV—IV of FIG. 1.

DETAILED DESCRIPTION OF THE PREFERRED EMBODIMENTS

In a way known per se, the fixing system comprises:

a nut 1 with two wings 2 adapted for passing axially through an elongate hole 3 formed in the portion of the metal sheet on which it is desired to provide fixing, a cage formed by a mouldable plastic material socket 5 formed with two diametrically opposite longitudinal windows 6 adapted so that the wings 2 of nut 1 pass jointedly therethrough.

The socket ends at one of its axial ends in a continuous external collar 7 sufficiently extensive to cover the edge of hole 3 entirely.

External bosses 8 are integrally moulded with the socket, in the immediate vicinity of collar 7, at positions angularly staggered by 90° with respect to windows 6, the contour of which bosses is substantially complementary to that of hole 3.

The operation of such a system is the following.

After nut 1 has been positioned in cage 5 by fitting it transversely through windows 6, the assembly is introduced axially into hole 3 formed in metal sheet 4 while correctly orientating the wings 2 of said nut and, if need be, i.e. if the hole is a little smaller than the nut, by slanting said assembly accordingly.

Then, after bosses 8 have axially abutted against the metal sheet 4, the assembly is rotated through 90° about its axis, which presents said bosses 8 axially opposite the longitudinal ends of hole 3.

Then these bosses are fitted into these ends and the system is in position.

For fixing a piece on the metal sheet 4, it is then sufficient:

to apply this piece externally against collar 7 so as to place a recess of said piece, which is generally a circular hole, coaxially to the system, then to introduce a bolt axially successively into the recess, then into cage 5 and into nut 1, and finally to screw up the bolt in the nut, which draws the nut axially closer to the metal sheet 4 until its wings 2 come into axial abutment against this metal sheet.

The above described fixing system is improved in accordance with the invention by a cap 9 which jointedly covers collar 7.

This cap has a flat bottom 10 perforated at 11 so as to let the fixing bolts pass therethrough, and axially bent flanges 12.

The axial height h of these flanges 12, from the horizontal interface of collar 7 and flat bottom 10 to the top of steel plate 4, is equal to or preferably slightly less than the thickness of collar 7.

At least one of these flanges 12 is bent at more than 90° so as to imprison collar 7.

In the embodiment illustrated, collar 7, as well as cap 9 which covers it, both have a rectangular shape and it is the flanges 12 corresponding to the small sides of the rectangle which are bent to more than 90°.

The presence of this cap does not in practice modify the procedure for positioning the fixing system and implementing the fixing itself.

But it has several advantages, and in particular the following.

the cap necessarily maintains between metal sheet 4 and the piece fixed on this metal sheet a gap of relatively large thickness h sufficient to let even thick paint penetrate, said cap protects the collar 7 by avoiding excessive crushing thereof during screwing, the end of such screwing being ensured in a way exactly defined by a succession of exclusively metal-metal contacts, there is no risk of the metal sheet 4 being deformed in a hollow shape in the vicinity of the edge of hole 3 because of the pressure exerted on this edge by the head of the bolt which cooperates with nut 1: in fact, the screwing pressure is not applied here on the metal sheet 4 at the level of the edge of hole 3, but at the level of the edges of flanges 12 of cap 9, the screwing providing fixing ends by a very firm axial application of the edges of flanges 12 of cap 9 against metal sheet 4, which reinforces the strength of the fixing because of the very intimate contacts which are thus formed locally.

Cap 9 may be made from any desirable metal or alloy.

It is for example formed from a steel plate coated with an aluminium-zinc coating: with such a coating, the above mentioned local intimate contact is accompanied by an electro-chemical reaction between the mutually applied surfaces, which provides self-protection of the contact zone.

The thickness of the metal sheet forming the cap is about 1 mm, being generally between 0.5 and 2 mm and the height h itself varies as a function of the general dimensions of the cap being for example between 2 and 4 mm.

According to another improvement also provided by the invention to the fixing systems of the above-mentioned kind, cage 5 may comprise;

external lugs 13 with oblique ramps disposed angularly in the middle of bosses 8 and adapted to bear against the "inner" face of metal sheet 4, as soon as said lugs expand by snapping at the end of the axial introduction of bosses 8 into hole 3, which provides a firm axial application of the cage against the metal sheet, and inner catches 14 with oblique ramps adapted for holding nut 1 in the bottom of the cage the furthest away from collar 7 after the nut has been positioned in this bottom.

The resistance imposed by lugs 13 to axial detachment of the cage with respect to the metal sheet is greater than the resistance imposed by catches 14 to the axial movements of the nut in the cage.

The two following consequences result from this arrangement:

nut 1 remains at the bottom of the cage as long as the fixing system is not used, which may be advantageous in certain situations, in particular when the system is fitted reversely on the metal sheet, i.e. upwards, but, during the screwing for fixing to the metal sheet, nut 1 is readily released from the bottom of the cage to draw axially nearer the metal sheet without the cage ceasing to be held axially against this metal sheet.

There can be further seen in the drawings, for lightening the cage and facilitating manufacture thereof by moulding:

longitudinal apertures 15 formed opposite lugs 13 in bosses 8 and collar 7, and longitudinal apertures 16 formed opposite catches 14 in the portion of socket 5 the furthest away from collar 7 and in a part of the bottom 17 of this socket which is advantageously formed by a ring apertured so that the ends of the fixing bolts may pass therethrough.

There can also be seen in the drawings:

a truncated cone shaped depression 18 formed in the central portion of the flat bottom 10 of cap 9 and ending in orifice 11, which depression guides the beginning of introduction of the bolts in the system, and openings 19 formed at the four corners of the cap between the contiguous flanges 1 2 perpendicular in twos.

Following which, and whatever the embodiment adopted, fixing systems are finally obtained whose construction, use and advantages follow sufficiently from the foregoing.

As is evident: and as it follows moreover already from what has gone before, the invention is in no way limited to those of its modes of application and embodiments which have been more especially considered: it embraces, on the contrary, all variants thereof.

We claim:

1. An anchor nut-cage fixing system to be applied on a metal sheet from one of the faces of this metal sheet in order to receive bolts presented from the same face, comprising: a nut with wings for fitting into an elongate hole formed in the metal sheet; and a holding and guiding cage for mounting in said hole, said cage being formed by a moulded plastic material socket split longitudinally by windows through which the wings of the nut pass jointedly, said socket being connected to an external collar at one of its ends, and external bosses integrally moulded with this socket being provided for extending into the hole for angularly locking the socket after axial introduction thereof with the nut in said hole, after an angular displacement of 90° of the socket with the nut, wherein the fixing system further comprises a flat metal cap, jointedly covering the external collar, the cap being perforated so as to allow a bolt to pass through and having axially bent flanges whose axial height below the interface of the collar and the cap is equal to or slightly less than the thickness of the collar, wherein at least one of the flanges is bent slightly more than 90° so as to imprison the collar.

2. A fixing system according to claim 1, wherein the collar is a rectangle, the bent flanges are four in number, and wherein each flange extends along one side of the rectangle and two of the four flanges, opposite to one another, are bent more than 90° so as to imprison the collar.

3. A fixing system according to claim 1, wherein the cage comprises external lugs with oblique ramps for bearing axially against the metal sheet after a positioning of the cage on said metal sheet, and inner catches with oblique ramps adapted for temporarily holding the nut in the cage bottom away from the collar after the nut has been positioned in said bottom, the resistance imposed by said axial movements of the nut in the cage being very much less than the resistance imposed by the external lugs to detachment of the cage with respect to the metal sheet.

* * * * *